(12) United States Patent
Nishimoto et al.

(10) Patent No.: US 6,400,564 B1
(45) Date of Patent: Jun. 4, 2002

(54) SWITCH GUIDE FOR A BICYCLE CONTROL PANEL

(75) Inventors: Naohiro Nishimoto, Wakayama; Takuji Masui, Osaka, both of (JP)

(73) Assignee: Shimano Inc., Osaka (JP)

( * ) Notice: Subject to any disclaimer, the term of this patent is extended or adjusted under 35 U.S.C. 154(b) by 100 days.

(21) Appl. No.: 09/661,974

(22) Filed: Sep. 14, 2000

(51) Int. Cl.$^7$ ................................................ G06F 1/16
(52) U.S. Cl. ........................ 361/683; 361/625; 340/432; 188/24.11
(58) Field of Search ........................ 361/683, 610–625, 361/641–645; 340/692, 427, 432, 456, 438, 441, 884; 74/489, 502.2, 473.1, 551.9; 368/10, 69, 74, 82, 188.22; 188/2 D, 24.11, 24.15, 24.22; 318/286, 283, 293, 466, 468, 2; 180/218, 219, 221; 70/233, 236; 345/102, 63, 211; 600/500, 502, 503; 200/5 A, 5 R, 6 R, 5 E, 293, 294, 296, 310–317, 341, 345, 333, 512, 517, 561

(56) References Cited

U.S. PATENT DOCUMENTS

| | | | | |
|---|---|---|---|---|
| 4,071,892 A | * | 1/1978 | Genzling | 364/424 |
| 4,455,463 A | * | 6/1984 | Rohl | 200/61.85 |
| 4,490,127 A | * | 12/1984 | Matsumoto et al. | 476/116 |
| 4,508,944 A | * | 4/1985 | Yashima et al. | 200/61.85 |
| 4,565,909 A | * | 1/1986 | Yashima et al. | 200/52 R |
| 4,636,769 A | | 1/1987 | Tsuyama | 340/134 |
| 4,641,723 A | * | 2/1987 | Takanashi et al. | 180/332 |
| 4,881,187 A | * | 11/1989 | Read | 364/565 |
| 5,213,548 A | * | 5/1993 | Colbert et al. | 474/71 |
| 5,308,419 A | | 5/1994 | Sakurai | 156/73.1 |
| 5,625,336 A | * | 4/1997 | Yamamoto | 340/432 |
| 5,900,705 A | * | 5/1999 | Kimura | 318/286 |
| 6,069,788 A | | 5/2000 | Masui | 361/683 |
| 6,073,730 A | * | 6/2000 | Abe | 188/24.11 |
| 6,167,774 B1 | * | 1/2001 | Gagnon et al. | 74/473.12 |
| 6,204,752 B1 | * | 3/2001 | Kishimoto | 340/432 |
| 6,317,036 B1 | * | 11/2001 | Popat et al. | 340/432 |

* cited by examiner

*Primary Examiner*—Darren Schuberg
*Assistant Examiner*—Michael Datskovsky
(74) *Attorney, Agent, or Firm*—Jeffer Mangels Butler & Marmaro LLP

(57) ABSTRACT

A switch guide located between a pair of switches on a computerized bicycle control panel is disclosed for guiding a bicycle rider's thumb to a proper switch on a bicycle handle bar. The switch guide is preferably a protrusion dimensioned to be detected by the bicycle rider's thumb. In a preferred embodiment of the invention, the height of the switch guide is greater than the height of the switch. In an alternative embodiment, the height of the switch guide is greater than the height of the switch, when the switch is activated. The switch guide is located in sufficient proximity to the switches to allow the rider's thumb to access one of the switches by moving the thumb to one side of the switch guide and the other switch by moving the thumb to the other side of the switch guide.

8 Claims, 4 Drawing Sheets

SWITCH GUIDE FOR A BICYCLE CONTROL PANEL

FIELD OF THE INVENTION

The present invention relates generally to bicycle control panels, and more particularly to a switch guide located between a pair of switches on a computerized bicycle control panel for guiding a bicycle rider's thumb to a proper switch on the control panel.

BACKGROUND OF THE INVENTION

Modern bicycles allow the rider to control the gears, the brakes and other features of the bicycle to optimize the rider's experience. Much of the control functions are computerized so that a rider can control the particular function by simply pressing a switch on a control panel. A typical computerized control panel includes a base member mounted to the bicycle handlebar and numerous switches on the control panel, each switch corresponding to a particular function that is controllable by the rider.

During a ride, it may be desirable for the rider to repeatedly manipulate various switches to adapt to the varying road conditions. For instance, if the bicycle ride covers an uphill or downhill terrain, the rider may wish to change the gears to correspond to the incline of the terrain. In this regard, the rider would manipulate a switch that would cause the change in the bicycle gears. It is important to some riders to be able to activate the switch at a precise time corresponding to a particular location or condition in the ride.

The problem with operating a control panel is that, during a bicycle ride, it may be difficult to quickly find and activate the correct switch. The switches on the control panel are often set close together, increasing the possibility that a rider may inadvertently activate the wrong switch. Also, road conditions frequently vary and when the rider is maneuvering rough and bumpy terrain, the chances of pressing the wrong switch is increased.

In known control panels, a visual indicator is provided to inform the rider of the function of each switch. When riding, however, it is inconvenient, and at time unsafe, for the rider to take his eyes off of the road and look at the visual indicators on the control panel to find the desired switch. If the rider does not wish to look down at the control panel, the rider must guess or estimate the location of the switch, which is increasingly difficult on a bumpy terrain.

Accordingly, it is desirable to provide an indicator that would guide a bicycle rider to the correct switch without requiring the rider to look down at the control panel.

It is also desirable to provide a guide in a convenient location that is easily accessible to the rider and would require minimal effort to use.

It is also desirable to provide a guide that would be simple and inexpensive to manufacture.

SUMMARY OF THE PREFERRED EMBODIMENTS

The present invention overcomes the aforementioned problems by providing a switch guide located between a pair of switches on a computerized bicycle control panel for guiding a bicycle rider's thumb to a proper switch on the control panel. The switch guide is preferably a protrusion dimensioned to be detected by the bicycle rider's thumb. In a preferred embodiment of the invention, the height of the switch guide is greater than the height of the switch for easy detection by the bicycle rider. In an alternative embodiment, the height of the switch guide is greater than the height of the switch, when the switch is activated.

In another embodiment of the invention, the switch guide is a depression located between a pair of switches. The depression is dimensioned to be detected by the bicycle rider's thumb.

The switch guide is located in sufficient proximity to the switches to allow the rider's thumb to access one of the switches by moving the thumb to one side of the switch guide and the other switch by moving the thumb to the other side of the switch guide. The switch guide is preferably located exactly in the middle of the region between the first and second switches so that it is equidistant from each switch. When a rider detects the switch guide, the rider knows that his thumb is centered between the pair of switches. From the switch guide, the rider can move his or her thumb to one side of the guide to access a first switch and to the other side of the guide to access a second switch. Accordingly, the switch guide allows a rider to accurately and quickly access a desired switch without looking down at the control panel, in rough and bumpy terrain.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1A:
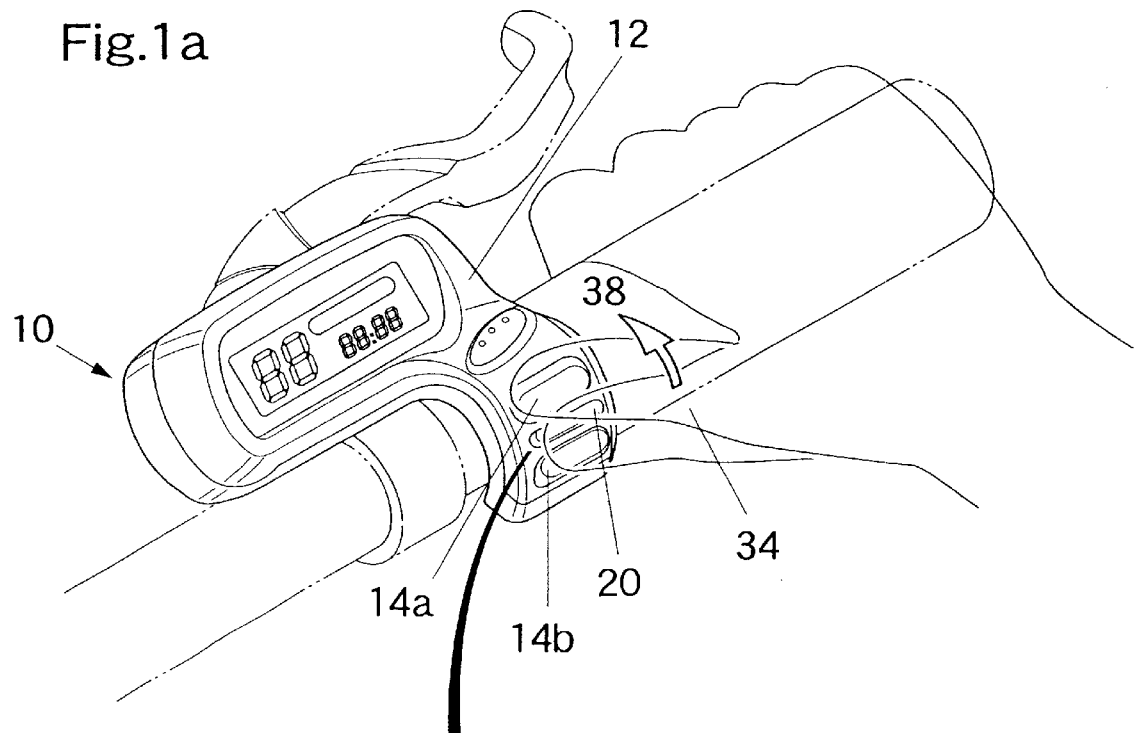
FIG. 1a is a perspective view of an embodiment of the switch guide of the present invention, depicting a bicycle rider moving his thumb from the switch guide to a switch located above the switch guide.

An exemplary embodiment of a bicycle control panel according to the principles of the present invention is illustrated in FIGS. 1 through 5 and identified by reference numeral 10. As shown in FIGS. 1a, 1b, 2a and 2b, control panel 10 includes a control panel base 12 and a plurality of switches 14a, 14b located on the control panel base 12. As an exemplary embodiment, the figures depict two switches 14a, 14b, however, the invention is not intended to be limited as such, and the control panel can include any number of switches. Switches 14a, 14b are used herein to include buttons, keys, indicators or any other device which, when activated, will initiate an operation, either mechanically or electrically. As an exemplary embodiment, switches 14a and 14b could be shifting switches that change the front or rear gears.

Figure 1B:
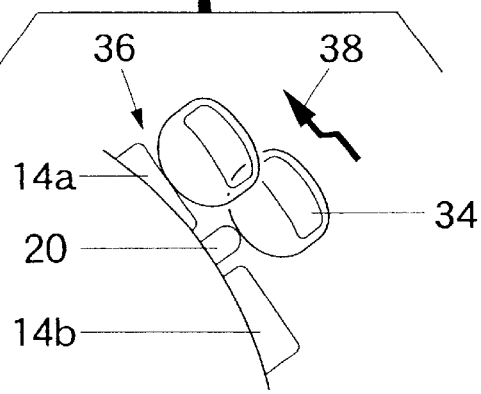
FIG. 1b is a side view of an embodiment of the switch guide of the present invention located between two switches, depicting a bicycle rider moving his thumb from the switch guide to a switch located above the switch guide.
Figure 2A:
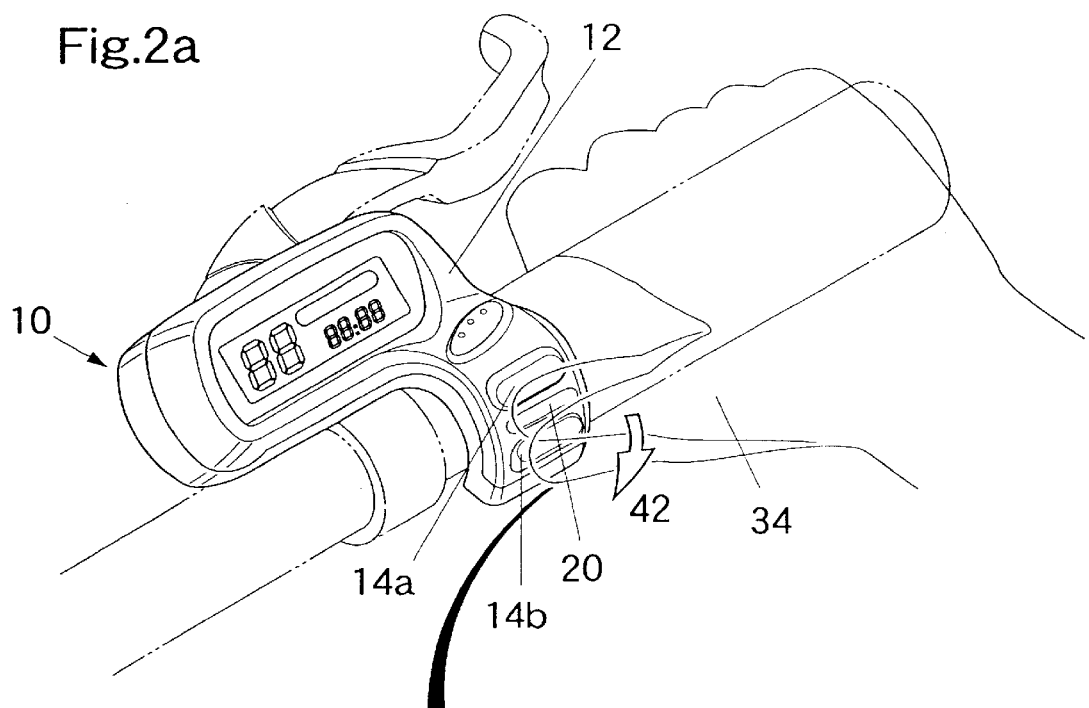
FIG. 2a is a perspective view of an embodiment of the switch guide of the present invention, depicting a bicycle rider moving his thumb from the switch guide to a switch located below the switch guide.
Figure 2B:
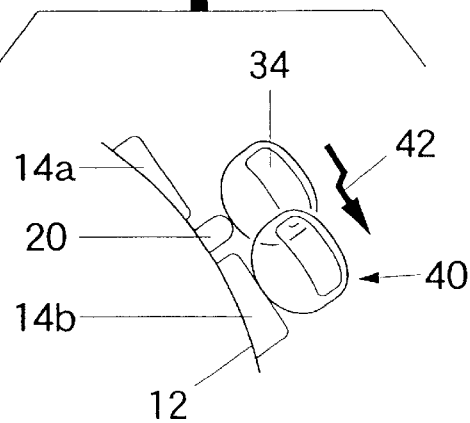
FIG. 2b is a side view of an embodiment of the switch guide of the present invention located between two switches, depicting a bicycle rider moving his thumb from the switch guide to a switch located below the switch guide.
Figure 5:
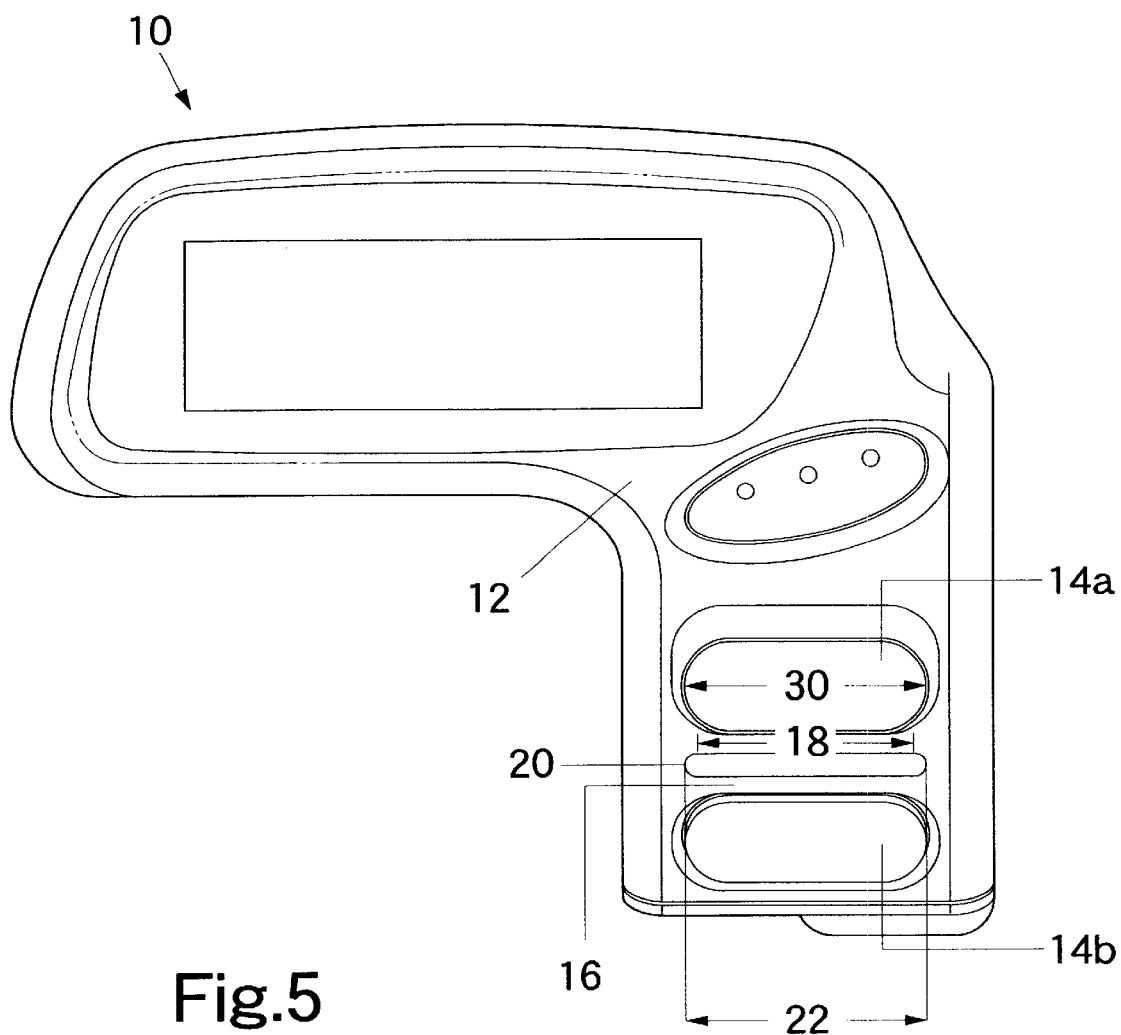
FIG. 5 is a plan view of a bicycle control panel having an embodiment of the switch guide of the present invention located between two switches.

The switches 14a, 14b preferably extend from the control panel base 10. In another embodiment of the invention, the switches can be soft keys that are aligned with the control panel base 12 and do not protrude therefrom. The switches 14a, 14b are preferably adjacent to each other, defining a region 16 therebetween. As best shown in FIGS. 1b, 2b and 5, a switch guide 20 is provided in the region 16 between a first switch 14a and a second switch 14b. In one embodiment of the present invention, the switch guide 20 is completely situated in the region 16 between the first switch 14a and second switch 14b. In another embodiment of the invention, the switch guide 20 has a length 22 that is equal to, or substantially equal to, the length 18 of the region 16 between the first switch 14a and the second switch 14b, such that the switch guide occupies the entire length 18 of the region 16.

Figure 3:
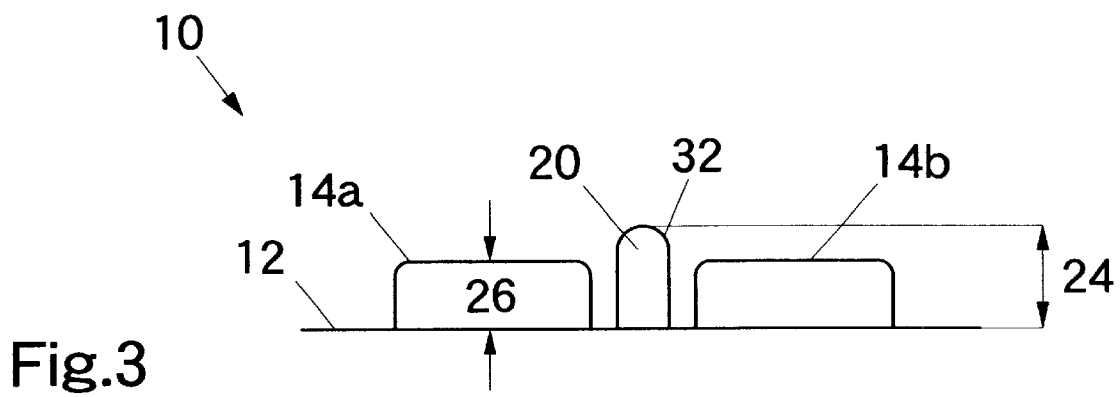
FIG. 3 is a side view of an embodiment of the switch guide of the present invention wherein the height of the switch guide is greater than the height of the switches.
Figure 4:
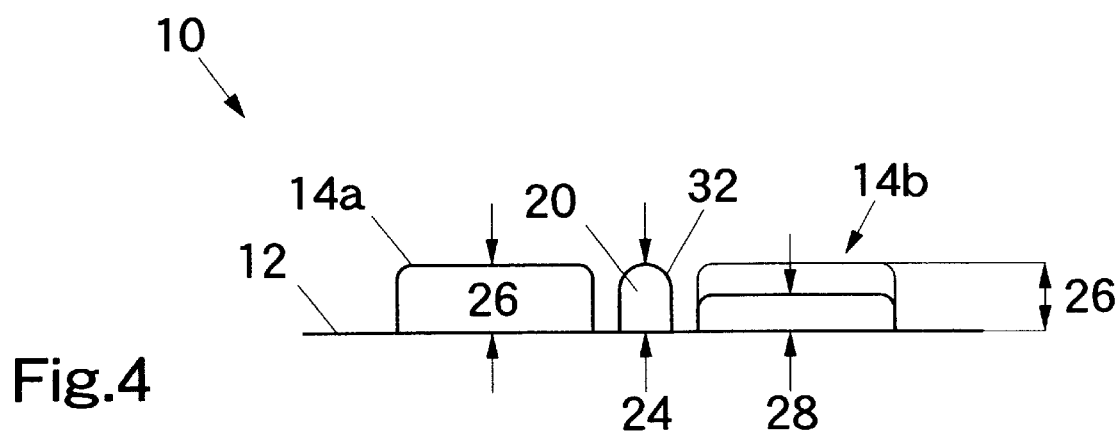
FIG. 4 is a side view of an embodiment of the switch guide of the present invention wherein the height of the switch guide is greater than the height of a switch, when the switch is activated.

The switch guide 20 preferably protrudes from the control panel base and is dimensioned to be detectable by a human hand. In one embodiment of the invention, as shown in FIG. 3, the height 24 of the switch guide 20 is greater than the height 26 of the adjacent switches 14a, 14b. In another embodiment of the invention, as shown in FIG. 4, the height 24 of the switch guide 20 is greater than the height 26 of the adjacent switches 14a, 14b, only when the switch is activated. As shown in FIG. 4, according to one embodiment of the invention, the switch 14b can be activated by pressing thereon. In an activated state, the switch 14b has a shorter height 28 than the height 26 of the switch at its initial rest position, as shown with switch 14a, and in phantom with switch 14b.

In a preferred embodiment, as shown in FIG. 5, the length 22 of the switch guide 20 is equal to the length 30 of the switch 14a, 14b. The switch guide 20 is preferably located equidistant from the first switch 14a and the second switch 14b, in the center of region 16. The switch guide 20 is preferably rigid and non-movable, such that a rider will not activate any mechanical or electrical operation by touching the switch guide 20. The shape of the switch guide 20 can be ergonomically designed to suit the comfort of the bicycle rider. In the embodiment depicted in FIGS. 3 and 4, the switch guide is shown as having a dome-shaped upper section 32. In another embodiment of the invention, the switch guide 20 can have a flat upper section (not shown), defining a rectangular cross-section of the switch guide 20.

In an alternative embodiment, the switch guide 20 is a depression (not shown) in the control panel base 12 between the switches 14a, 14b. The size of the depression is dimensioned to be detectable by the human hand.

The switch guide 20 of the present invention assists a bicycle rider in finding and activating the proper switch without requiring the rider to look down at the control panel 10. While riding, the bicycle rider has his hands on the handlebar, as shown in FIGS. 1a and 1b. The switch guide 20 is preferably situated on the control panel such that the rider's thumb 34 can rest comfortably on the switch guide 20 while the rider is riding the bicycle. Switches 14a and 14b are located in sufficient proximity to the switch guide 20 to allow the thumb to access the first switch 14a or the second switch 14b by moving the thumb to one side of the switch guide 20 or the other side of the switch guide 20. In the preferred embodiment of the present invention there are no structural elements between the switch guide 20 and the switches 14a, 14b.

FIGS. 1a and 1b show a bicycle rider placing his thumb on the switch guide 20 and moving his thumb to a first side 36 of the switch guide 20, in the direction shown by the arrow 38, to access switch 14a. FIGS. 2a and 2b show a bicycle rider placing his thumb on the switch guide 20 and moving his thumb to a second side of the 40 of the switch guide 20, in the direction shown by the arrow 42, to access switch 14b. Once the rider has accessed the desired switch 14a or 14b, then the switch can be activated to perform the desired function.

One advantage of the switch guide of the present invention is that it guides a bicycle rider to the correct switch without requiring the rider to look down at the control panel. Furthermore, it would require minimal effort for the rider to use the switch guide. Even in the roughest and bumpiest terrain, the rider can quickly and easily access the desired switches without having to worry about activating the incorrect switch.

What is claimed is:

1. A computerized bicycle control panel, comprising:
    a pair of switches; and
    a protrusion positioned between the switches.

2. A bicycle control panel in accordance with claim 1, wherein each switch has a switch height, the protrusion has a protrusion height, and the protrusion height is greater than the switch height.

3. A bicycle control panel in accordance with claim 1, wherein each switch defines an first height when the switch is at an initial rest position and a second height when the switch is at an activated position, and wherein the protrusion has a protrusion height that is greater than the second height of the switch when the switch is at the activated position.

4. A bicycle control panel in accordance with claim 1 wherein the protrusion has a rectangular cross-section.

5. A bicycle handle, comprising:
    a control panel;
    a pair of switches on the control panel; and
    a protrusion located between the switches on the control panel.

6. A method of guiding a bicycle rider's thumb to a proper switch on a bicycle handle bar, comprising the steps of:
    providing a protrusion on the bicycle handle bar, wherein the protrusion is dimensioned to be detected by the bicycle rider's finger;

providing a first switch positioned on a first side of the protrusion and a second switch positioned on a second side of the protrusion, such that the protrusion is located between the first switch and the second switch; and wherein the first and second switches are located in sufficient proximity to the protrusion to allow the thumb to access the first switch or the second switch by moving the thumb to the first side or the second side of the protrusion, respectively.

7. A method in accordance with claim 6, further comprising the steps of:

manipulating the bicycle rider's thumb to contact the first switch or the second switch by moving the thumb to the first side or the second side of the protrusion, respectively.

8. A method in accordance with claim 7, further comprising the steps of activating either the first switch or the second switch.

* * * * *